United States Patent
LeBeau et al.

(10) Patent No.: US 9,342,268 B2
(45) Date of Patent: May 17, 2016

(54) MULTI-LEVEL VOICE MENU

(71) Applicant: Google Inc., Mountain View, CA (US)

(72) Inventors: Michael J. LeBeau, New York, NY (US); Clifford Ivar Nass, Stanford, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/884,480

(22) Filed: Oct. 15, 2015

(65) Prior Publication Data

US 2016/0034254 A1 Feb. 4, 2016

Related U.S. Application Data

(63) Continuation of application No. 13/754,488, filed on Jan. 30, 2013, now Pat. No. 9,190,074.

(51) Int. Cl.
| | | |
|---|---|---|
| *G10L 21/00* | (2013.01) | |
| *G10L 25/00* | (2013.01) | |
| *G10L 15/00* | (2013.01) | |
| *G06F 3/16* | (2006.01) | |
| *G10L 15/22* | (2006.01) | |

(52) U.S. Cl.
CPC ............... *G06F 3/167* (2013.01); *G10L 15/22* (2013.01); *G10L 2015/223* (2013.01)

(58) Field of Classification Search
CPC ....... G10L 15/22; G10L 15/265; G06F 3/167; H04M 2201/40
USPC .......................................................... 704/275
See application file for complete search history.

(56) References Cited

U.S. PATENT DOCUMENTS

| 6,127,990 A | 10/2000 | Zwern |
| 6,233,560 B1 | 5/2001 | Tannenbaum |
| 8,161,172 B2 | 4/2012 | Reisman |
| 8,234,119 B2 | 7/2012 | Dhawan et al. |

(Continued)

FOREIGN PATENT DOCUMENTS

| WO | 2009/013518 | 1/2009 |
| WO | 2012/040086 | 3/2012 |

OTHER PUBLICATIONS

Bringert et al., U.S. Appl. No. 13/620,987, filed Sep. 15, 2012, 29 pages.

(Continued)

*Primary Examiner* — Jesse Pullias

(74) *Attorney, Agent, or Firm* — McDonnell Boehnen Hulbert & Berghoff

(57) ABSTRACT

Methods, apparatus, and computer-readable media are described herein related to a user interface (UI) that can be implemented on a head-mountable device (HMD). The UI can include a voice-navigable UI. The voice-navigable UI can include a voice navigable menu that includes one or more menu items. The voice-navigable UI can also present a first visible menu that includes at least a portion of the voice navigable menu. In response to a first utterance comprising one of the one or more menu items, the voice-navigable UI can modify the first visible menu to display one or more commands associated with the first menu item. In response to a second utterance comprising a first command, the voice-navigable UI can invoke the first command. In some embodiments, the voice-navigable UI can display a second visible menu, where the first command can be displayed above other menu items in the second visible menu.

20 Claims, 14 Drawing Sheets

(56) References Cited

U.S. PATENT DOCUMENTS

| | | |
|---|---|---|
| 8,452,602 B1 | 5/2013 | Bringert et al. |
| 2003/0005076 A1 | 1/2003 | Koch et al. |
| 2004/0225499 A1 | 11/2004 | Wang et al. |
| 2007/0213984 A1 | 9/2007 | Ativanichayaphong et al. |
| 2008/0065486 A1 | 3/2008 | Vincent et al. |
| 2009/0177477 A1 | 7/2009 | Nenov et al. |
| 2009/0328101 A1 | 12/2009 | Suomela et al. |
| 2010/0031150 A1 | 2/2010 | Andrew |
| 2010/0076850 A1 | 3/2010 | Parekh et al. |
| 2011/0187640 A1 | 8/2011 | Jacobsen et al. |
| 2015/0279839 A1 | 10/2015 | LeBeau et al. |

OTHER PUBLICATIONS

LeBeau et al., U.S. Appl. No. 13/622,180, filed Sep. 18, 2012, 31 pages.

Office Action for U.S. Appl. No. 13/754,488 mailed Mar. 23, 2015, 14 pages.

Notice of Allowance for U.S. Appl. No. 13/754,488 mailed Jul. 13, 2015, 9 pages.

MULTI-LEVEL VOICE MENU

CROSS-REFERENCE TO RELATED APPLICATION

This application is a continuation of co-owned U.S. patent application Ser. No. 13/754,488, filed Jan. 30, 2013, the contents of which are hereby incorporated by reference.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming.

SUMMARY

These as well as other aspects, advantages, and alternatives will become apparent to those of ordinary skill in the art by reading the following detailed description, with reference where appropriate to the accompanying drawings.

HMDs can use a voice-navigable user interface. Phrases in the voice-navigable user interface that can be uttered by a user may be prompted by a "cue" displayed on a visible portion of the interface. Menu items in a voice menu of operations can be displayed textually and can operate as cues, providing a user with words or phrases to say to navigate the menu or to invoke commands. In some embodiments, menu items can include voice commands that can be invoked by a user. The commands may be grouped by categories. Displaying the available categories can provide cues to a user and inform a user of the menu items available to be uttered to navigate to available commands. In some embodiments, after commands are invoked, some commands may be displayed more prominently than other menu items.

In one aspect, a method is provided. The method comprising: at a head-mountable device (HMD) with a voice-navigable user interface, displaying a first visible menu comprising at least a portion of a voice navigable menu, wherein the voice navigable menu includes one or more menu items; receiving a first utterance at the HMD, the first utterance comprising a first menu item, wherein the one or more menu items comprise the first menu item; after receiving the first utterance, modifying the first visible menu to display one or more commands associated with the first menu item; receiving a second utterance at the HMD, the second utterance comprising a first command; and after receiving the second utterance, invoking the first command.

In another aspect, a head-mountable device (HMD) is provided. The HMD comprises: a processor; and a non-transitory computer-readable medium configured to store at least program instructions that, when executed by the processor, cause the HMD to carry out functions comprising: displaying a first visible menu comprising at least a portion of a voice navigable menu, wherein the voice navigable menu includes one or more menu items, receiving a first utterance, the first utterance comprising a first menu item, wherein the one or more menu items comprise the first menu item, after receiving the first utterance, modifying the first visible menu to display one or more commands associated with the first menu item, receiving a second utterance, the second utterance comprising a first command, and after receiving the second utterance, invoking the first command.

In yet another aspect, a non-transitory computer-readable medium is provided. The non-transitory computer readable medium is configured to store at least program instructions that, when executed by a processor, cause the processor to carry out functions comprising: displaying a first visible menu comprising at least a portion of a voice navigable menu, wherein the voice navigable menu includes one or more menu items; receiving a first utterance, the first utterance comprising a first menu item, wherein the one or more menu items comprise the first menu item; after receiving the first utterance, modifying the first visible menu to display one or more commands associated with the first menu item; receiving a second utterance, the second utterance comprising a first command; and after receiving the second utterance, invoking the first command.

The following clauses are offered as further descriptions of example embodiments:

Clause 1—a device, comprising a means for displaying a first visible menu comprising at least a portion of a voice navigable menu, wherein the voice navigable menu includes one or more menu items; a means for receiving a first utterance, the first utterance comprising a first menu item, wherein the one or more menu items comprise the first menu item; a means for, after receiving the first utterance, modifying the first visible menu to display one or more commands associated with the first menu item; a means for receiving a second utterance, the second utterance comprising a first command; and a means for, after receiving the second utterance, invoking the first command.

Clause 2—The device of clause 1, further comprising: a means for displaying at least a portion of a second visible menu, wherein the second visible menu includes the first command and at least one menu item of the one or more menu items; and wherein the second visible menu displays the first command above the at least one menu item.

Clause 3—The device of clause 2, further comprising: a means for receiving a third utterance, the third utterance comprising a second command, the second command differing from the first command; a means for, after receiving the third utterance, invoking the second command; a means for displaying at least a portion of a third visible menu, wherein the third visible menu includes the second command and at least one menu item of the one or more menu items, and wherein the third visible menu displays the second command above the at least one menu item.

Clause 4—The device of clause 3, wherein the third visible menu further includes the first command; and wherein an order in which the first command and the second command are displayed in the third visible menu is determined based on at least a frequency of use for the first command and a frequency of use for the second command.

Clause 5—The device of clause 3, wherein the third visible menu further includes the first command; and wherein an order in which the first command and the second command are displayed in the third visible menu is determined based on at least a recency of use for the first command and a recency of use for the second command.

Clause 6—The device of clause 3, wherein the third visible menu further includes the first command; and wherein an order in which the first command and the second command are displayed in the third visible menu is determined based on at least a combination of a frequency of use and a recency of use for the first command and a combination of a frequency of use and a recency of use for the second command.

Clause 7—The device of clause 1, wherein the means for displaying a first visible menu further comprises: a means for displaying at least a portion of the first visible menu in response to the HMD receiving a hotword utterance comprising a hotword.

Clause 8—The device of clause 1, wherein the first menu item comprises an identification of a category.

Clause 9—The device of clause 1, wherein at least one menu item of the one or more menu items comprises a command.

Clause 10—The device of clause 1, wherein at least one menu item of the one or more menu items comprises an identification of a category.

Clause 11—The device of clause 1, wherein the first command is associated with the first menu item.

Clause 12—The device of clause 1, wherein the means for modifying the first visible menu to display the one or more commands associated with the first menu item comprises a means for expanding the first visible menu to display the one or more commands in-line with the first menu item.

Clause 13—The device of clause 1, wherein the means for modifying the first visible menu to display the one or more commands associated with the first menu item comprises a means for displaying the one or more commands as a sub-menu.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrative embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1A:
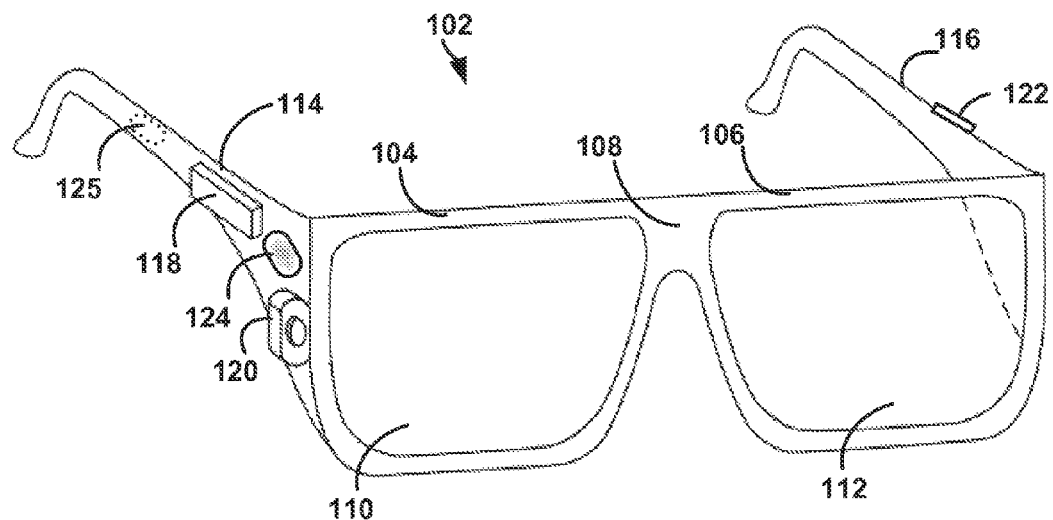
FIG. 1A illustrates a wearable computing system according to an example embodiment.

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

A. Overview

Some user interfaces, such as head mounted displays ("HMDs"), can place a visual display or displays close to one or both eyes of a wearer. Such displays may occupy part or all of a wearer's field of view. Due to size limitations, the display may have room for presenting only a limited amount of visible text.

HMDs can use a voice-navigable user interface (VNUI). The VNUI can include one or more microphones to capture audible input, such as speech uttered by a user or wearer of the HMD. Upon receiving audible input, the HMD can attempt to recognize the input as a speech command and process the command accordingly; for example, by converting the audible input to text and operating on the text. The speech input can represent commands to the HMD, such as commands to search, navigate, take photos, record videos, send messages, make telephone calls, etc.

One example scenario includes a VNUI, in which a user can invoke the VNUI of the HMD by uttering a phrase, such as "ok glass." In other words, "ok glass" in this instance is a "hotword" to trigger activation of a VNUI.

The phrase "ok glass," as well as other phrases in the VNUI that can be uttered by a user, may be prompted by a "cue" displayed on a visible portion of the interface. The cue can be simply the textual phrase displayed on the visual display.

In some embodiments, invoking the VNUI can provide access to a voice menu of operations. The voice menu of operations can, in turn, be displayed in the visible portion of the VNUI. Menu items can be displayed textually and can operate as cues, providing a user with words or phrases to speak in order to navigate the menu or invoke commands.

If the number of menu items is relatively small, the entire menu may be able to be displayed in the visible portion of the VNUI. If, however, there are more menu items than can be displayed by the VNUI, the VNUI can have a helpful system for organizing or simplifying the presentation of the menu items.

In some embodiments, the menu items include voice commands that can be invoked by a user. One way to organize voice commands is to group the voice commands by contextually related categories. To maintain simplicity, a menu, such as a top-level menu, for example, can display the categories without necessarily displaying each command within each category. Such a presentation can simplify the visible menu by showing a user fewer menu items than a list of all available commands.

Displaying the available categories can provide cues to a user and inform a user of the menu items available to be uttered to navigate to available commands. In other words, a user can visually see available categories, and can efficiently navigate through the voice command menu without needing to guess at which categories or commands may be available via the VNUI.

Example categories can include (i) Camera, (ii) Communication, and (iii) Information Retrieval (such as Internet searching or navigation).

Each category can then include one or more commands. Continuing the example above, example Camera category commands can include (i) "take a photo" and (ii) "record a video." Under the Communication category, example commands can include (i) "send a message" and (ii) "make a call." And under the Information Retrieval category, example commands can include (i) "Internet search" and (ii) "navigate." Other categories and commands are possible as well.

Accordingly, commands can be invoked via the VNUI by uttering a sequence such as "ok glass, open camera, take a photo."

Using categories can provide a readily navigable, hierarchical user interface display to remind users of possible vocal phrases and commands. The display can help new users learn phrases and commands, and can remind prior users of phrases and commands infrequently or not recently used. The display can speed adoption of the voice-navigable user interface, let users/wearers know about new commands/categories of commands, and provide visual feedback that spoken menu items have been properly processed by the HMD.

B. Example Wearable Computing Devices

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) that may be used to track eye movements and/or determine the direction of a wearer's gaze. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
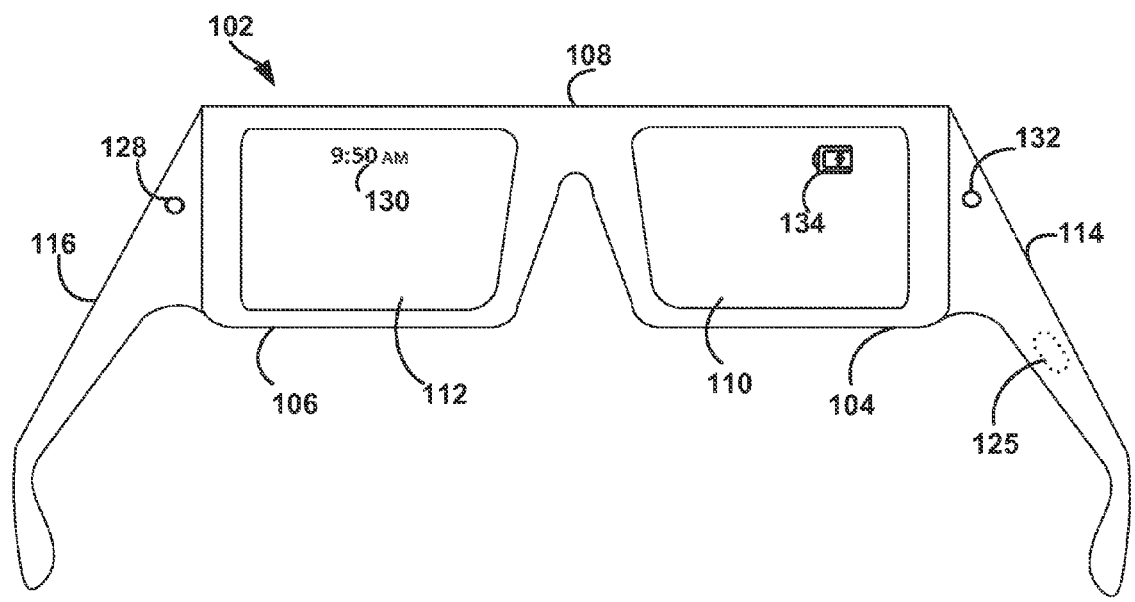
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
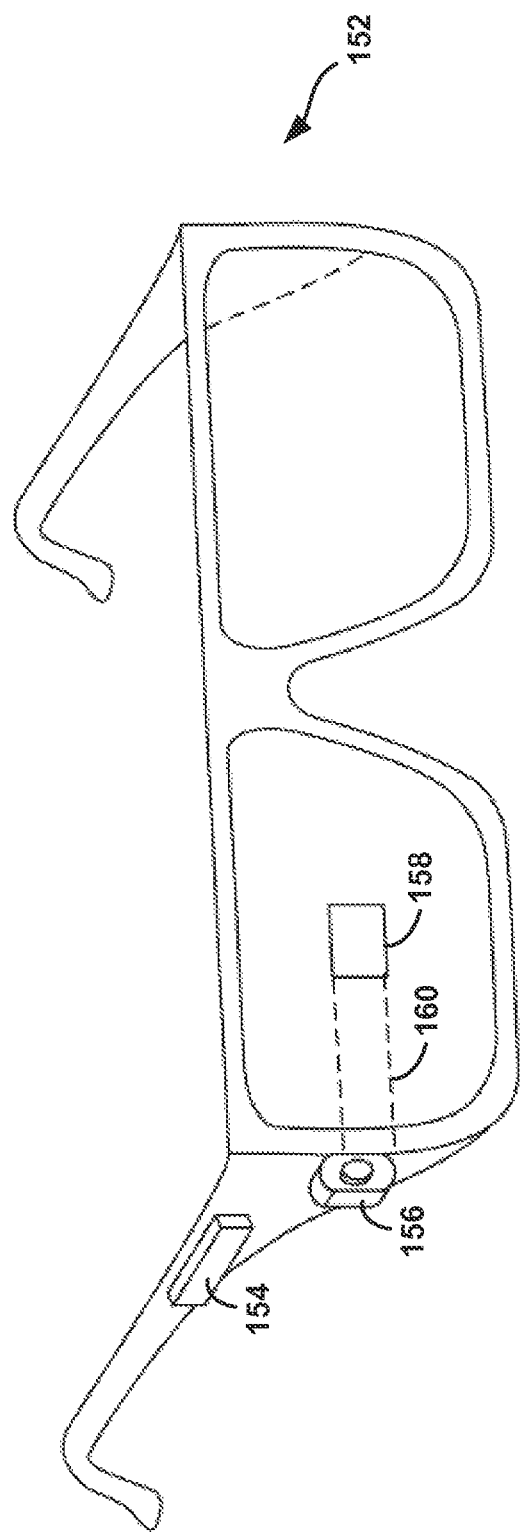
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
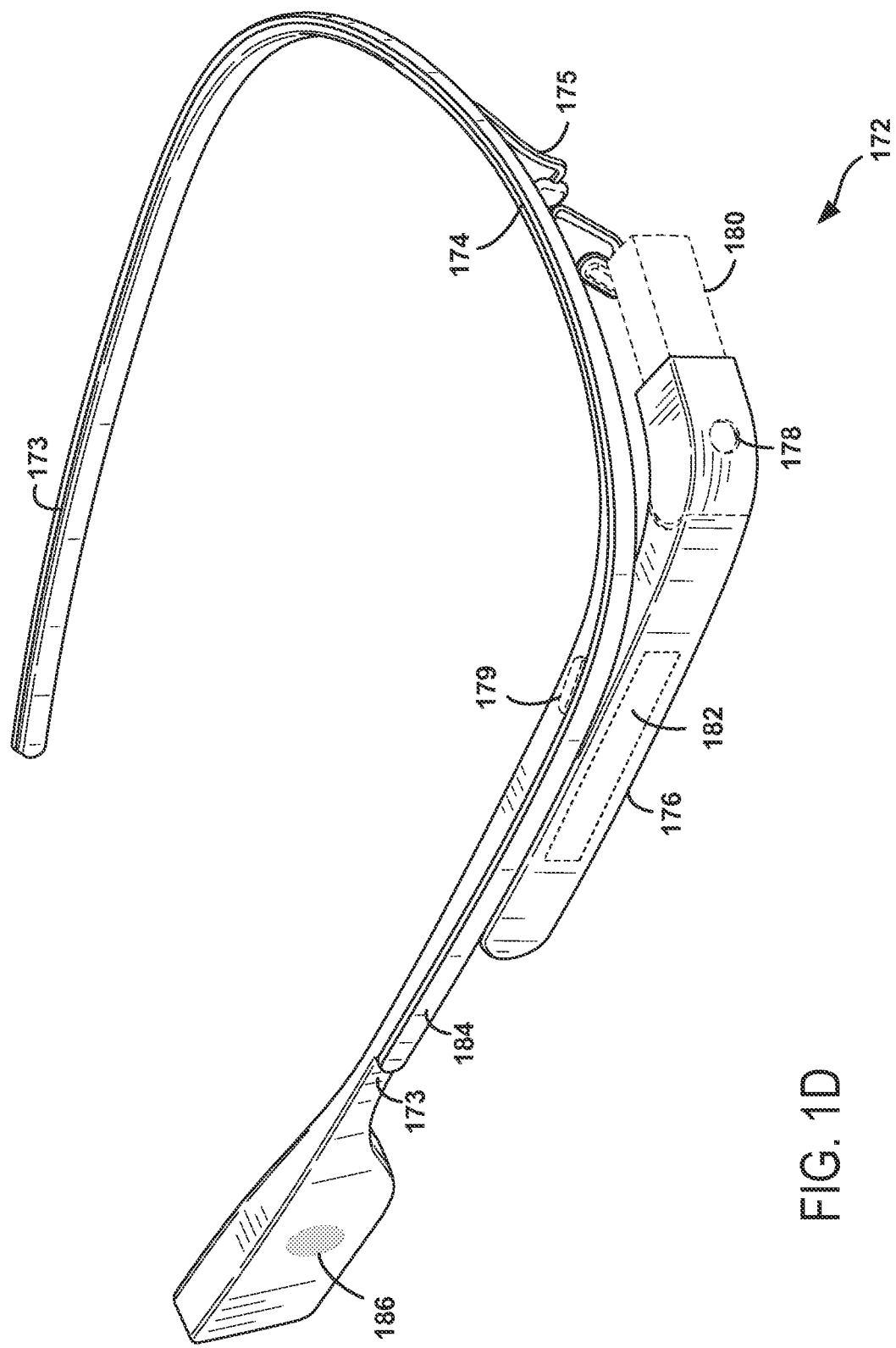
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
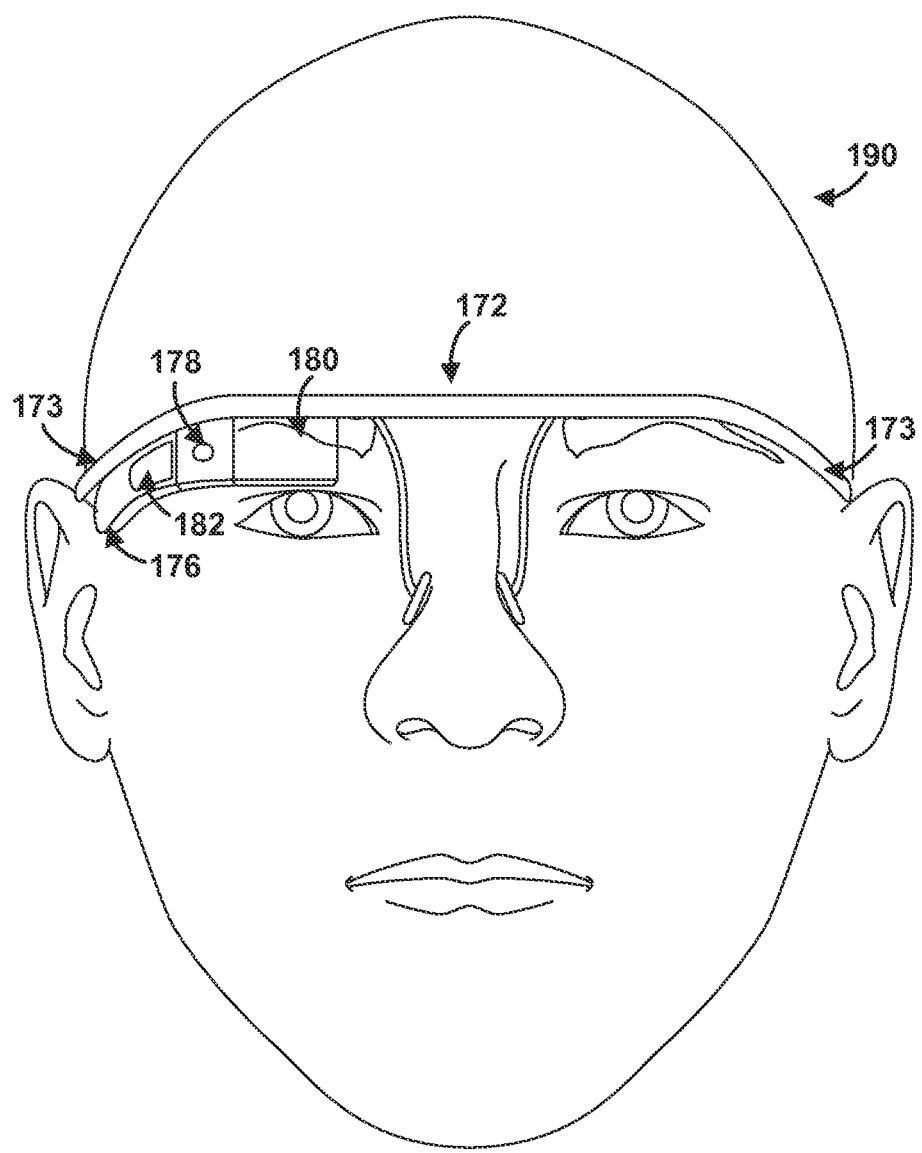
FIGS. 1E to 1G are simplified illustrations of the wearable computing system shown in FIG. 1D, being worn by a wearer.
Figure 1F:
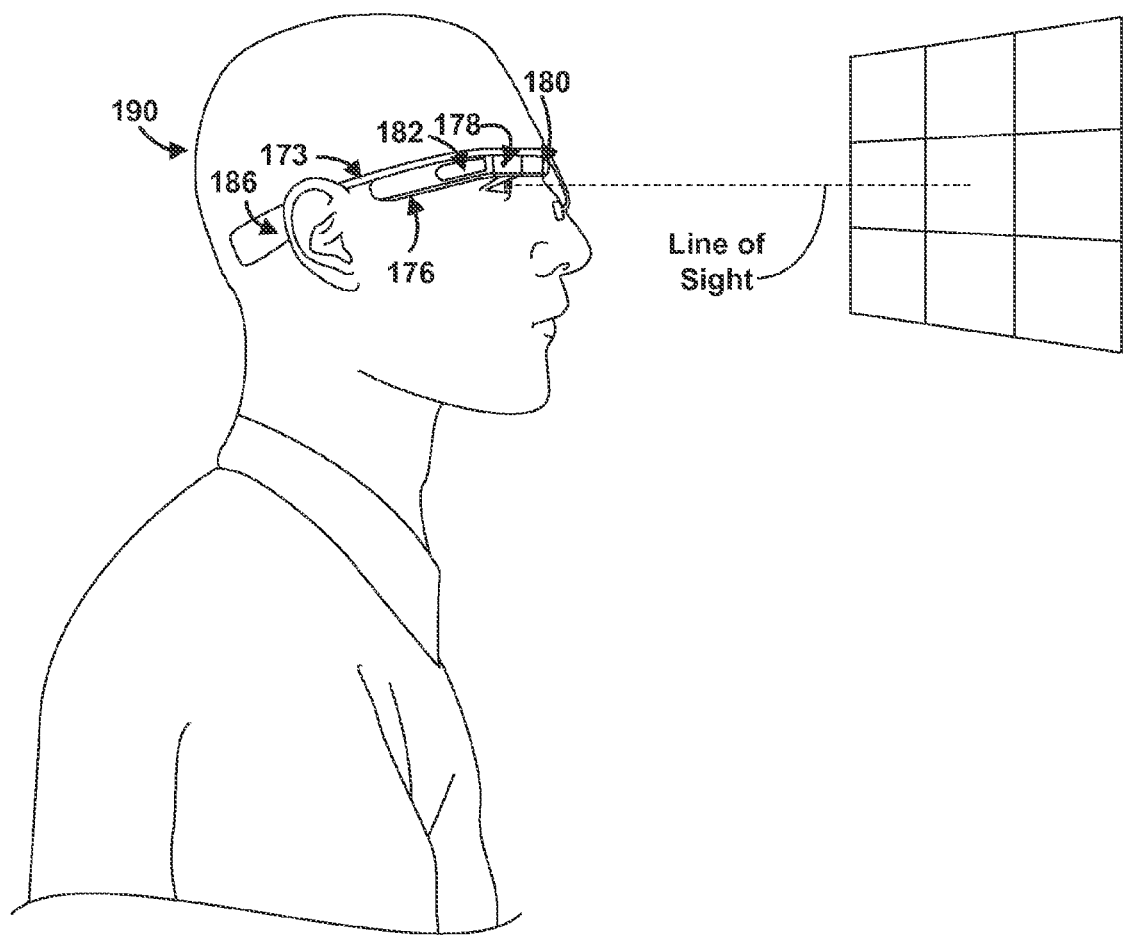
Figure 1G:
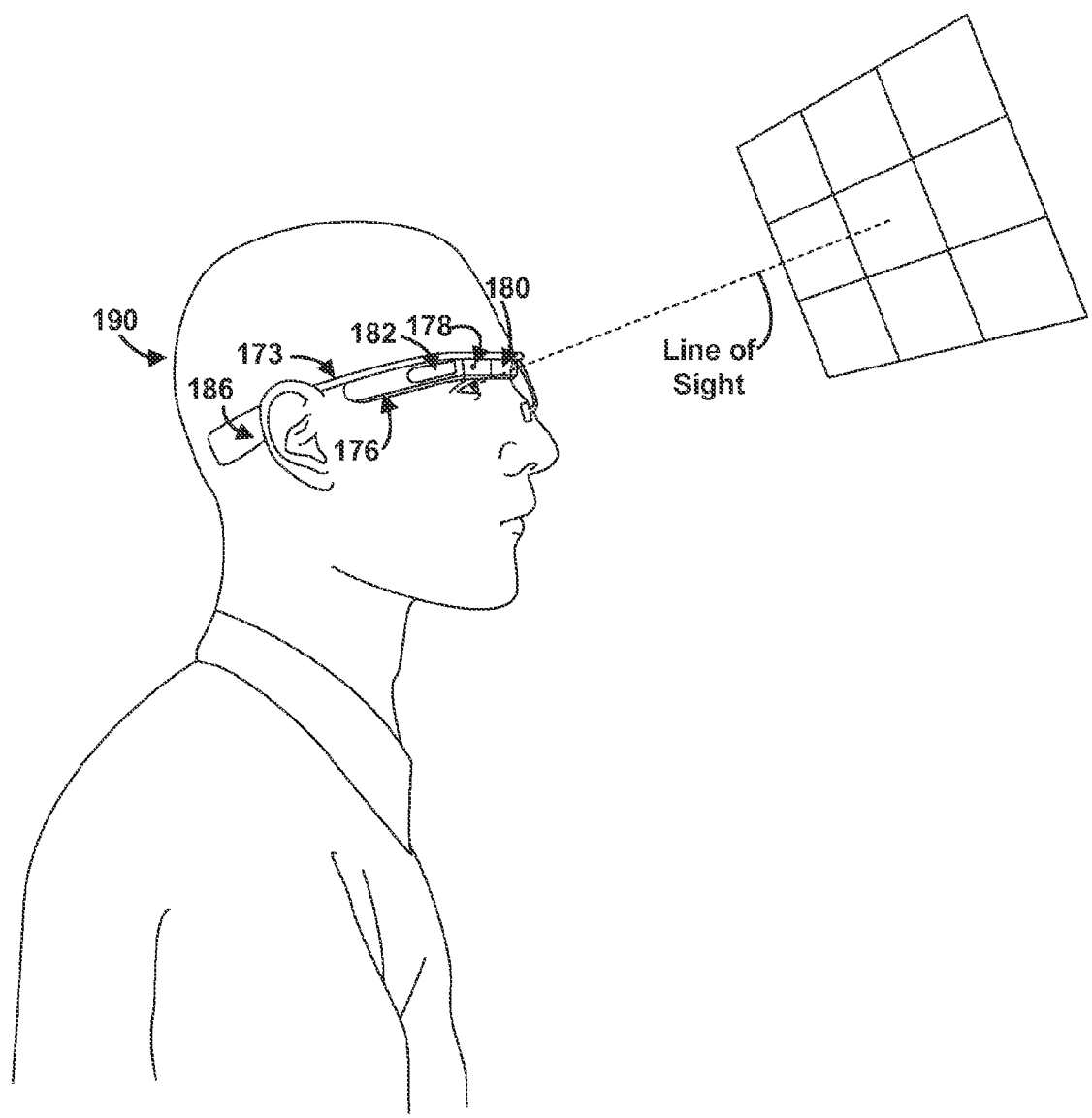

FIGS. 1E to 1G are simplified illustrations of the HMD 172 shown in FIG. 1D, being worn by a wearer 190. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

Figure 2A:
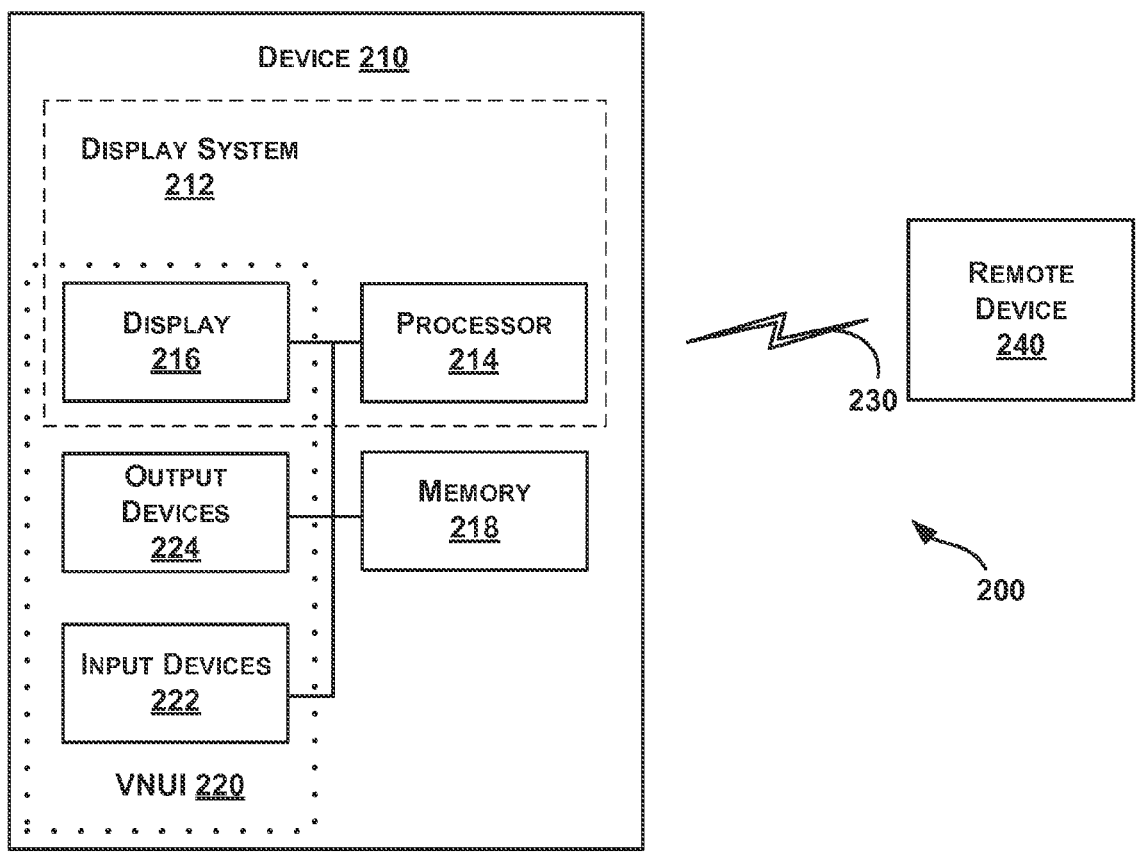
FIG. 2A is a simplified block diagram of a computing device according to an example embodiment.

FIG. 2A is a simplified block diagram of a computing device 210 according to an example embodiment. In an example embodiment, device 210 communicates using a communication link 230 (e.g., a wired or wireless connection) to a remote device 240. The device 210 may be any type of device that can receive data and display information corresponding to or associated with the data. For example, the device 210 may be a heads-up display system, such as the head-mounted devices (HMDs) 102, 152, 172, or 252 described with reference to FIGS. 1A-1G and 2B.

Thus, the device 210 may include a display system 212 comprising a processor 214 and a display 216. The display 210 may be, for example, an optical see-through display, an optical see-around display, or a video see-through display. The processor 214 may receive data from the remote device 240, and configure the data for display on the display 216. The processor 214 may be any type of processor, such as a microprocessor or a digital signal processor, for example.

The device 210 may further include on-board data storage, such as memory 218 coupled to the processor 214. The memory 218 may store software that can be accessed and executed by the processor 214, for example.

The remote device 240 may be any type of computing device or transmitter including a laptop computer, a mobile telephone, or tablet computing device, etc., that is configured to transmit data to the device 210. The remote device 240 and the device 210 may contain hardware to enable the communication link 230, such as processors, transmitters, receivers, antennas, etc.

Further, remote device 240 may take the form of or be implemented in a computing system that is in communication with and configured to perform functions on behalf of client device, such as computing device 210. Such a remote device 240 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 2A, the communication link 230 is illustrated as a wireless connection; however, wired connections may also be used. For example, the communication link 230 may be a wired serial bus such as a universal serial bus or a parallel bus. A wired connection may be a proprietary connection as well. The communication link 230 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 240 may be accessible via the Internet and may include a computing cluster associated with a particular web service (e.g., social-networking, photo sharing, address book, etc.).

C. Example Image Projection

Figure 2B:
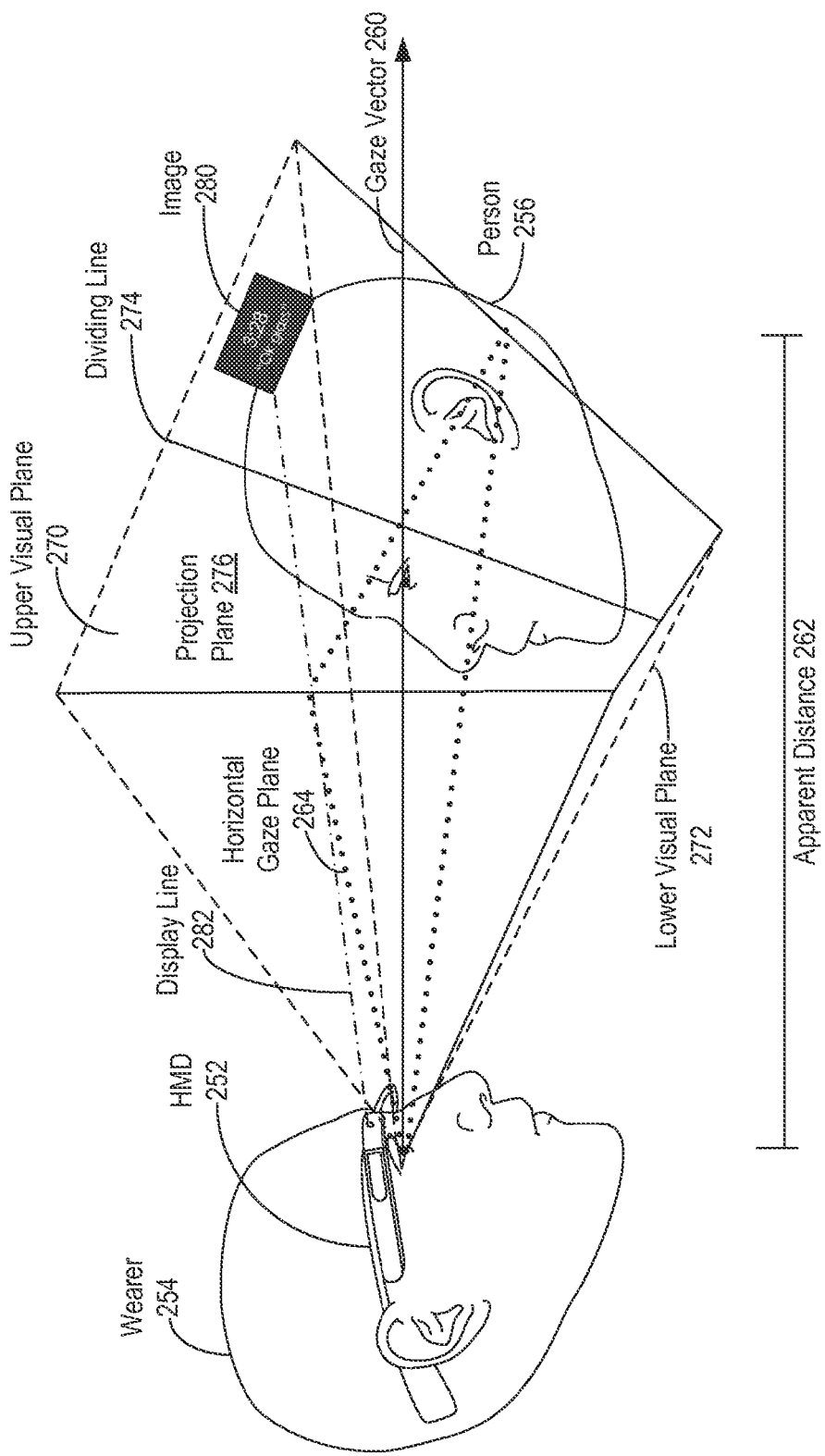
FIG. 2B shows a projection of an image by a head-mountable device, according to an example embodiment.

FIG. 2B shows an example projection of UI elements described herein via an image 280 by an example head-mountable device (HMD) 252, according to an example embodiment. Other configurations of an HMD may be also be used to present the UI described herein via image 280. FIG. 2B shows wearer 254 of HMD 252 looking at an eye of person 256. As such, wearer 254's gaze, or direction of viewing, is along gaze vector 260. A horizontal plane, such as horizontal gaze plane 264 can then be used to divide space into three portions: space above horizontal gaze plane 264, space in horizontal gaze plane 264, and space below horizontal gaze plane 264. In the context of projection plane 276, horizontal gaze plane 260 appears as a line that divides projection plane into a subplane above the line of horizontal gaze plane 260, a subplane a subspace below the line of horizontal gaze plane 260, and the line where horizontal gaze plane 260 intersects projection plane 276. In FIG. 2B, horizontal gaze plane 264 is shown using dotted lines.

Additionally, a dividing plane, indicated using dividing line 274 can be drawn to separate space into three other portions: space to the left of the dividing plane, space on the dividing plane, and space to right of the dividing plane. In the context of projection plane 276, the dividing plane intersects projection plane 276 at dividing line 274. Thus the dividing plane divides projection plane into: a subplane to the left of dividing line 274, a subplane to the right of dividing line 274, and dividing line 274. In FIG. 2B, dividing line 274 is shown as a solid line.

Humans, such wearer 254, when gazing in a gaze direction, may have limits on what objects can be seen above and below the gaze direction. FIG. 2B shows the upper visual plane 270 as the uppermost plane that wearer 254 can see while gazing along gaze vector 260, and shows lower visual plane 272 as the lowermost plane that wearer 254 can see while gazing along gaze vector 260. In FIG. 2B, upper visual plane 270 and lower visual plane 272 are shown using dashed lines.

The HMD can project an image for view by wearer 254 at some apparent distance 262 along display line 282, which is shown as a dotted and dashed line in FIG. 2B. For example, apparent distance 262 can be 1 meter, four feet, infinity, or some other distance. That is, HMD 252 can generate a display, such as image 280, which appears to be at the apparent distance 262 from the eye of wearer 254 and in projection plane 276. In this example, image 280 is shown between horizontal gaze plane 264 and upper visual plane 270; that is image 280 is projected above gaze vector 260. In this example, image 280 is also projected to the right of dividing line 274. As image 280 is projected above and to the right of gaze vector 260, wearer 254 can look at person 256 without image 280 obscuring their general view. In one example, the display element of the HMD 252 is translucent when not active (i.e. when image 280 is not being displayed), and so the wearer 254 can perceive objects in the real world along the vector of display line 282.

Other example locations for displaying image 280 can be used to permit wearer 254 to look along gaze vector 260 without obscuring the view of objects along the gaze vector. For example, in some embodiments, image 280 can be projected above horizontal gaze plane 264 near and/or just above upper visual plane 270 to keep image 280 from obscuring most of wearer 254's view. Then, when wearer 254 wants to view image 280, wearer 254 can move their eyes such that their gaze is directly toward image 280.

D. An Example User Interface for an HMD

The display 216 of device 210 may be available as part of a user interface for an HMD, such as one of example HMDs 102, 152, 172, and 252, as discussed above in more detail in the context of at least FIG. 2A. The display 216 of device 210 can be used to display portions of a VNUI (voice-navigable user interface) 220, which can include display 216, input device(s) 222, such as microphone(s), to receive speech input, and output device(s) 224 such as the display, speaker(s), and/or BCT(s) for audio and/or video output. In an example operation, a user or wearer of an HMD may utter words or phrases displayed on a voice navigable menu to interact with the VNUI 220.

Figure 3A:
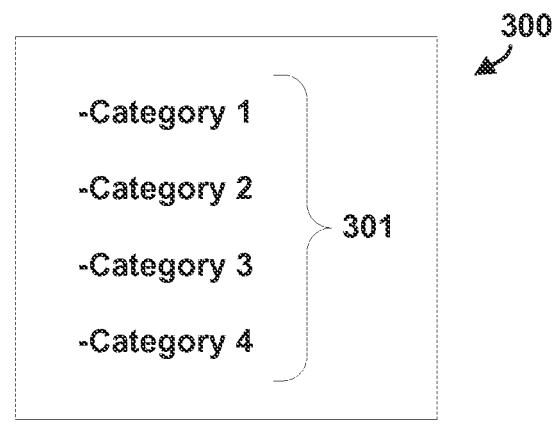
FIG. 3A shows an example voice navigable menu, according to an example embodiment.
Figure 3B:
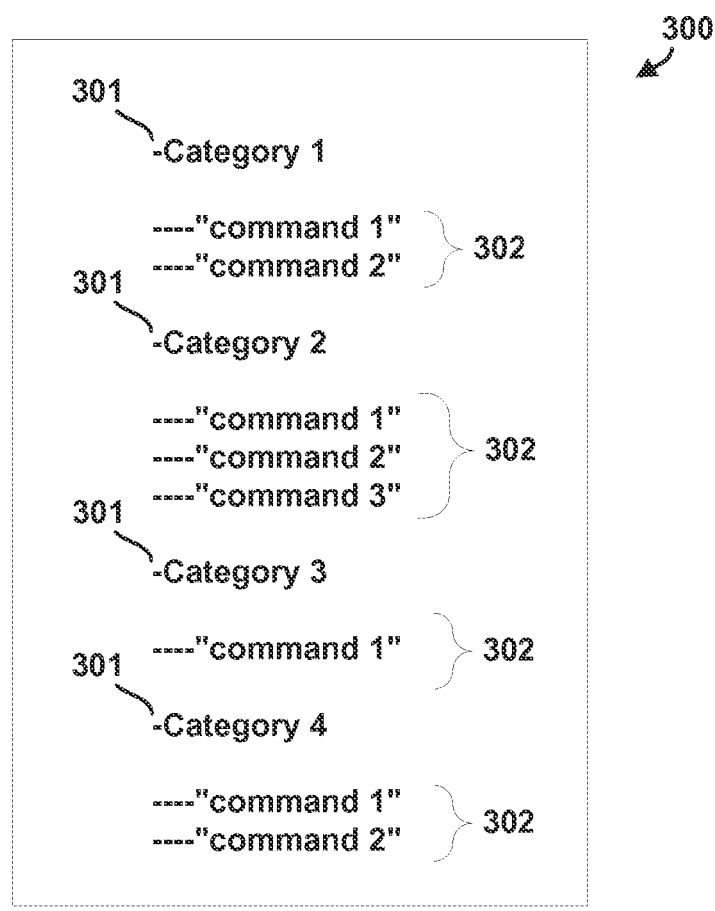
FIG. 3B shows an example voice navigable menu, according to an example embodiment.

FIGS. 3A and 3B show an example voice navigable menu 300, which VNUI 220 can present on the display 216. The voice navigable menu 300 can include one or more categories 301; e.g., "Category 1," "Category 2," "Category 3," and "Category 4" as shown in FIG. 3A. As used herein, a "category," for example, is a menu item that can describe or can be associated with one or more sub-items. For instance, a restaurant menu category "Breakfast" may describe a number of restaurant menu items for breakfast, such as eggs, toast, oatmeal, bacon, etc.

The voice navigable menu 300 can include menu items, such as categories 301 and commands 302 in FIGS. 3A and 3B. The menu items may be organized into "top-level" menu items and "sub-level" menu items. A top-level menu item is, generally, a menu item with which other menu items are associated. In some cases, a top-level menu item is a menu item that can be expanded to reveal lower level menu items, such as sub-level menu items. A sub-level menu item is, generally, a menu item that is associated with another menu item, such as a top-level menu item.

In some cases, the voice navigable menu 300 can have a parent-child hierarchy, in which top-level menu items correspond to a parent menu item and sub-level menu items correspond to a child menu item. In some cases, top-level menu items are displayed on one physical level of the menu, such as a root or base level, while sub-level menu items are displayed on a second physical level of the menu. In some embodiments, the voice navigable menu 300 displays top-level menu items as the left-most items in a display.

In some embodiments, the categories 301 comprise top-level menu items, as shown in FIGS. 3A and 3B. As shown in FIG. 3B, the categories 301—top-level menu items—can be displayed as the left-most (or least-indented) menu items.

Each category can include or be associated with one or more commands 302, and each command 302 can be associated with one or more of the categories 301. In some embodiments, the commands 302 can be sub-level menu items, as shown in FIG. 3B. As shown in FIG. 3B, the commands 302—sub-level menu items—can be displayed further to the right (or further indented) as compared to the top-level menu items.

The categories 301 and commands 302 can be some or all of the menu items in the voice navigable menu 300. For example, other menu items can include identifications of files. Other examples are possible as well.

Some or all of the menu items of the voice navigable menu 300 can be displayed to a wearer on the display 216. In some cases, an HMD may interpret certain head-movements as being wearer input, such as nodding, or looking up, down, left, or right. VNUI 220 may, in turn, interpret such movements as wearer input directing the voice navigable menu 300 to scroll, such that menu items previously not visible on display 216 become visible. In some cases, displayed menu items can also serve as cues to a wearer, by providing the wearer with a word or phrase that the wearer can utter to navigate the menu or invoke a command.

Such utterances by wearer(s) can include the categories 301 and the commands 302. In response to an utterance comprising one of the categories 301, VNUI 220 may display, on the display 216, the command or commands 302 associated with the uttered category. In response to an utterance comprising one of the commands 302, VNUI 220 may invoke the uttered command.

Figure 4:
FIG. 4 shows an example visible menu, according to an example embodiment.

FIG. 4 shows an example display 216. The example display 216 can include a visible menu 305. The visible menu 305 can include all or a part of the voice navigable menu 300. For example, in some embodiments, all of voice navigable menu 300 can be visible on the display 216 as visible menu 305. In other embodiments, only a portion of the voice navigable menu 300 may be visible on the display 216 as the visible menu 305. For example, space limitations on the display 216 and/or the length of the voice navigable menu 300 can limit visible menu 305 to displaying only a portion of voice navigable menu 300.

The visible menu 305, like the voice navigable menu 300, can include one or more menu items. In some embodiments, the visible menu 305 can display menu items from the voice navigable menu 300 in a modified or rearranged order. In some embodiments, the visible menu can display sub-level menu items above and/or as top-level menu items.

The visible menu 305 of FIG. 4 depicts, in this example, three example categories displayed as top-level menu items: Camera 310, Communication 320, and Information Retrieval 330. Other categories are possible as well. The visible menu 305 may include other menu items, such as commands, for example.

As discussed, a wearer can interact with the VNUI 220 by uttering a menu item, such as an identification of a category. In an example operation, a wearer may utter a phrase such as "ok glass, open camera" to address the HMD by saying "ok glass" and then requesting the HMD access a camera by saying "open camera."

Figure 5:
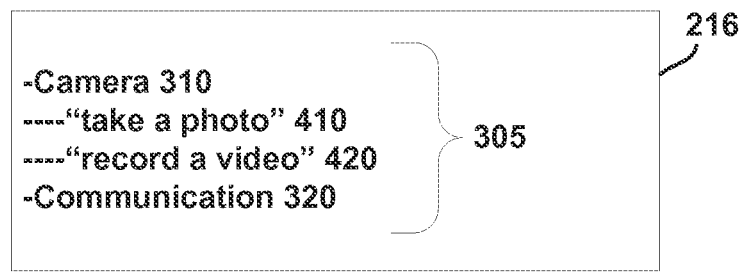
FIG. 5 shows an example visible menu, according to an example embodiment.

In response, VNUI 220 may then display in the visible menu 305 the available commands associated with the uttered category. For example, as shown in FIG. 5, example commands associated with the Camera category 310 may include "take a photo" 410 and "record a video" 420. Other commands are possible as well.

In some embodiments, when a wearer opens a category, VNUI 220 can show the commands associated with the category as sub-level menu items in-line with the top-level menu items, as shown in FIG. 5. In particular, FIG. 5 shows the "take a photo" 410 and "record a video" 420 sub-level commands in-line with the Camera 310 and Communication 320 top-level categories in the visible menu 305.

In this example, the VNUI associates a set of commands with a category by showing the commands below the associated category and slightly indented. Other ways of showing top-level menu items and sub-level menu items, and of differentiating top-level menu items from sub-level menu items, are possible as well. The visible menu 305 also includes another category, Communication 320, which is not associated with the displayed commands and which is displayed below the commands.

Figure 6:
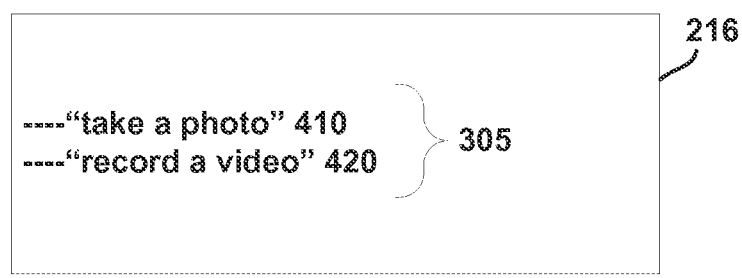
FIG. 6 shows an example visible menu, according to an example embodiment.

In other embodiments, when a wearer opens a category, VNUI 220 can show the commands as a stand-alone submenu on the display 216, as shown in FIG. 6. In particular, as seen in FIG. 6, the visible menu 305 includes commands associated with a particular category, but no categories or other menu items.

Minimizing the number of menu items in the visible menu 305 can increase focus on commands likely to be invoked and so allow more efficient invocation of those commands. For example, the two commands "take a photo" 410 and "record a video" 420 presented in the visible menu 305 of FIG. 6 may be the two commands a wearer is most likely to want to invoke (based on, for example, the wearer uttering an identification of the Camera 310 category).

In addition, by minimizing menu items in the visible menu 305, VNUI 220 may make navigating the menu more efficient. For example, a minimal or reduced number of menu items may keep a wearer from reading or mentally processing additional and potentially unneeded menu items.

In any case, VNUI 220 can highlight or more prominently display certain menu items. To do so, VNUI 220 can, for example, display the menu item at the top of the visible menu 305. In other embodiments, VNUI 220 can emphasize the menu item compared to one or more other menu items, without necessarily displaying the menu item at the top of the visible menu 305.

For example, once a wearer has invoked a command, VNUI 220 can "bubble-up" the command to the top of the visible menu 305 or to a position above another command or a category. In particular, the next time a wearer invokes the menu, VNUI 220 can present, for example, a most recently used and/or a most frequently used command above other menu items. In some cases, VNUI 220 can present the command at or near the top of the visible menu 305.

Figure 7:
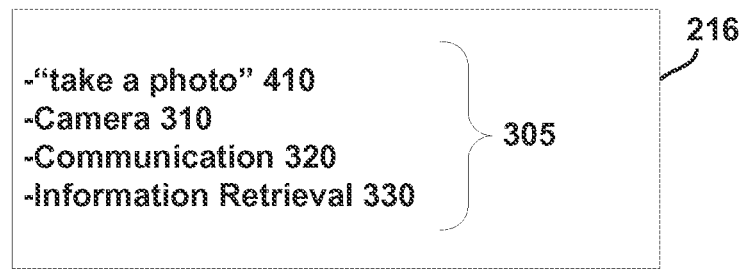
FIG. 7 shows an example visible menu, according to an example embodiment.

FIG. 7 shows an example menu in which the visible menu 305 includes the command "take a photo" 410 above the categories Camera 310, Communication 320, and Information retrieval 330. In FIG. 7, VNUI 220 has bubbled-up the command "take a photo" 410 to a position above the displayed categories. There may also be other menu items available but not displayed in the visible menu 305.

Figure 8A:
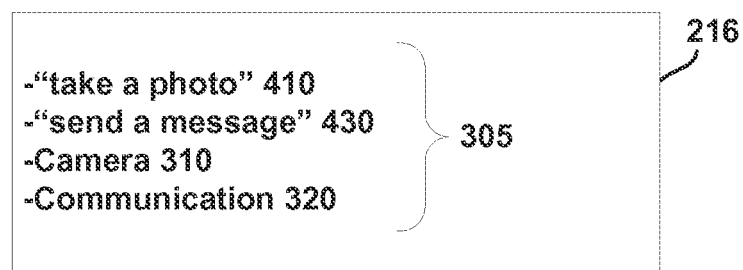
FIG. 8A shows an example visible menu, according to an example embodiment.

FIG. 8A shows an example menu in which the visible menu 305 includes the commands "take a photo" 410 and "send a message" 430 above the categories Camera 310 and Communication 320. Here, VNUI 220 has bubbled-up the commands "take a photo" 410 and "send a message" 430 to a position above the displayed categories. There may also be other menu items available but not displayed in the visible menu 305.

In any case, once a wearer has used VNUI 220 to navigate to and invoke one or more commands, the visible menu 305 can include both available categories and commands. In some embodiments, the visible menu can display both available categories and commands as top-level menu items, as in FIGS. 7 and 8A.

By bubbling up or prominently displaying one or more menu items, VNUI 220 can present the one or more menu items in a manner that attempts to predict a wearer's intent when using the VNUI. In particular, the VNUI can determine a command likely to be used, and the VNUI can display the command to appear more prominently than other menu items.

VNUI 220 can use any number of various criteria to determine which command or commands a wearer is likely to invoke. As one example, the VNUI can determine a command likely to be used based on how frequently commands are used by the wearer. In particular, the VNUI may bubble up the command or commands used most frequently by a wearer, such that a more frequently invoked command appears at the top of the menu.

As another example, the VNUI can determine a command likely to be used based on how recently a wearer has used the command. In particular, the VNUI may bubble up the command or commands used most recently by a wearer, such that a more recently invoked command appears at the top of the menu.

As yet another example, VNUI 220 can bubble up the commands based on some combination of criteria. For instance, the VNUI can bubble up commands based on a first criteria of how recently a wearer has used the command, and then, for those commands with similar frequencies of use, based on a second criteria of how recently a wearer has used the command or commands.

Taking the visible menu 305 of FIG. 6 as one particular example, VNUI 220 may have determined that a wearer is more likely to use the "take a photo" 410 command than other menu items. Accordingly, the VNUI can, in this example, display the "take a photo" 410 command above the other menu items in the visible menu 305.

Taking the visible menu 305 of FIG. 8A as another particular example, VNUI 220 may have determined that a wearer is more likely to use the "take a photo" 410 and "send a message" 430 commands than other menu items (such as other commands). Accordingly, VNUI 220 can, in this example, display the "take a photo" 410 and "send a message" 430 commands above the other menu items in the visible menu 305.

VNUI 220 may also have determined that a wearer is more likely to use the "take a photo" 410 command than the "send a message" 430 command. Accordingly, the VNUI can, in this example, display the command "take a photo" 410 above the command "send a message" 430 in the visible menu 305.

In addition, as one or more commands or menu items bubble up, other commands or menu items can "bubble down." For example, commands that have previously been bubbled up can be displaced by newly bubbled up commands. In some cases, a displaced command can be displayed below a newly bubbled up command. In other cases, the displaced command can be displayed only once a wearer utters the name of a category with which the displaced command is associated. Other examples are possible as well.

By bubbling up commands, the VNUI also encourages a wearer to speak the command directly from the top-level menu. If a wearer sees the command in a visible menu with top-level menu items, the wearer should not need to navigate to a submenu to view commands associated with a category before invoking the command. Accordingly, bubbling up commands may make the VNUI more efficient for a wearer.

As an example, a wearer can directly invoke a command that has been bubbled up to the top-level menu. In particular, FIG. 7 shows the command "take a photo" 410 bubbled up in the visible menu 305. A wearer can directly invoke this command via VNUI 220 by uttering a sequence such as "ok glass, take a photo," instead of having to navigate to the command by uttering the sequence "ok glass, open camera, take a photo."

Regardless of whether a command has been bubbled up or displayed more prominently, wearers of some embodiments can invoke a command directly from the top-level menu—without needing to navigate to a category. Some embodiments of the VNUI can incorporate a "hotword" approach to voice recognition. Each command can be treated as a hotword, and the VNUI can recognize and carry out the command, even if the command is not displayed on the visible menu 305.

As an example, other commands may not be visible in the visible menu 305 of FIG. 8A, although they may be available. In particular, VNUI 220 may include the command "record a video," which VNUI 220 may not display in the visible menu 305. A wearer can also directly invoke this command via VNUI 220 by uttering a sequence such as "ok glass, record a video," instead of having to navigate to the command by uttering a sequence such as "ok glass, open camera, record a video." Accordingly, the system allows a wearer to utter a command directly, without the command being visible on the menu.

The system also allows for a wearer to be able to invoke commands from one category while viewing commands from another category. For example, the visible menus 305 of FIG. 5 and FIG. 6 display commands in the category "Camera" 310. A wearer can also directly invoke, via VNUI 220, a command from another category, such as the command "send a message" 430 from the category Communication 320. In particular, from the visible menus 305 of FIG. 5 or 6, a wearer can utter a sequence such as "ok glass, send a message" to directly invoke the "send a message" command, even if that command is not displayed on the visible menu 305.

In some embodiments, a wearer may also use VNUI 220 to navigate to a category that is not in the visible display. For example, the visible menu 305 of FIG. 5 shows the category Camera 310 and the category Communication 320, but not the category Information Retrieval 330 (as shown in FIG. 4). In this example, from the visible menu 305 of FIG. 5, a wearer can utter a sequence such as "ok glass, open information retrieval" to view available commands in that category.

Associating commands with categories, bubbling up the command(s) most likely to be used, and allowing commands to be invoked from anywhere within the available menu can help the scalability of voice navigable menus. Such a system can allow for more voice commands to be added with minimal impact on the ability of the VNUI and visible display to efficiently guide a wearer through the menu.

The menu items in the visible menu 305 can act as cues for a wearer of the voice navigable menu 300. In other words, the items in the visible menu 305 can tell a wearer what to say to invoke a command or to navigate the menu. For example, by speaking a command, a wearer can invoke the command. And by speaking a category, a wearer can navigate to the available commands in that category.

The ability to efficiently guide a wearer through the voice navigable menu may be an especially important consideration for new or infrequent wearers. Likewise, even experienced wearers may be unfamiliar with available menu items such as commands or categories (such as, for example, if commands or categories are added to the voice navigable menu).

In particular, associating commands with categories can reduce the number of items displayed in, for example, a top-level menu. For instance, multiple commands can be associated with each category, and commands may be added to each category as the system develops. The number of categories will likely be less than the number of commands. A menu that displays some or all available categories may have fewer menu items than a menu that displays, for example, all available commands.

A menu with fewer menu items may be easier to navigate, especially on a smaller display of an HMD. In particular, an HMD may have a smaller display than other mobile computing devices. In some cases, an HMD may have a significantly smaller display than other computing devices. Accordingly, the display 216 and visible menu 305 of an HMD may also be smaller or significantly smaller than other computer devices.

Because of the smaller display 216, fewer menu items may be able to be presented to a wearer on the visible menu 305. Accordingly, the fewer menu items in the voice navigable menu 300, the better chance that the visible menu 305 can include the entire voice navigable menu. Alternatively, if the visible menu 305 only includes a portion of the entire voice navigable menu 300, minimizing the number of menu items in the voice navigable menu 300 should help increase the amount of the voice navigable menu 300 included in the visible menu 305.

A wearer's efficiency in navigating a voice navigable menu should increase with a wearer's ability to see more of the voice navigable menu in the display 216. In other words, the time spent by a wearer navigating the voice navigable menu should be less if the visible menu 305 includes more of the available categories and commands.

Bubbling up the command or commands most likely to be used can also help a wearer efficiently navigate a voice navigable menu. For example, the bubbled up commands may be the commands a wearer is most likely to want to invoke. In such a case, a wearer may be able to more quickly recall or invoke a command if the command is visually presented to the wearer—or visually presented to the wearer in a prominent way, such as at the top of a visible menu.

In particular, a wearer seeking a particular command may avoid having to navigate to that command. Instead, if that command is displayed in the top-level menu (at the top or in some other, prominent way), a wearer can immediately receive the visual cue for the command without having to navigate to the category.

In addition, allowing commands to be invoked from anywhere within the available menu can also reduce the need for a wearer to navigate to a particular category (or top-level visible menu) before invoking the command.

E. Updating the Example User Interface

Some embodiments also allow for the addition of applications or features, in some cases from third-parties. In such embodiments, the added applications can result in added commands. In the voice navigable menu, the added commands can be associated with an added command menu item, which can comprise an added command category in the voice navigable menu.

For discussion purposes, an added command can be distinguished from an original command. An original command can refer to a command that may have been originally provided in or, in some cases, previously added to a voice navigable menu. In addition, an added command menu item can be distinguished from an original menu item. An original menu item can refer to a menu item, such as a category, that may have been originally provided in or, in some cases, previously added to a voice navigable menu.

In some instances, the added applications can be treated collectively as a category in the voice-navigable menu (such as a "Glass Apps" category or an "Added Command" category, for example). In other cases, a third-party application or one or more added commands may be treated as its own category (such as a "Facebook" category, for example).

Figure 8B:
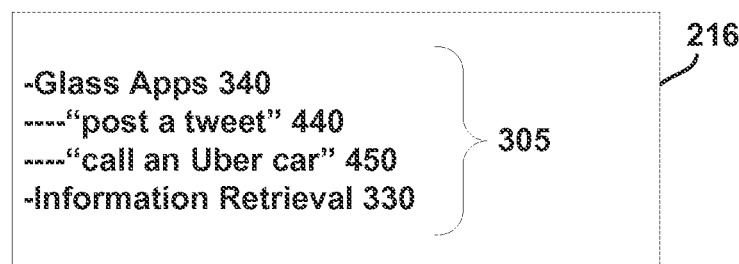
FIG. 8B shows an example visible menu, according to an example embodiment.

Turning to FIG. 8B, as a more particular example, a category for added applications (such as third-party applications) can be Glass Apps 340, and commands within that category may be, for example, (i) "post a tweet" 440 and (ii) "call an Uber car" 450—commands associated with two different third-party features.

As shown in FIG. 8B, in the visible menu 305, uttering "ok glass, open Glass Apps" would show the added commands "post a tweet" 440 and "call an Uber car" 450. Accordingly, added commands can be invoked via VNUI 220 by uttering a sequence such as "ok glass, open Glass Apps, post a tweet."

As with other commands, added commands such as "post a tweet" 440 and "call an Uber car" 450 can be bubbled up in the top-level menu. As also with other commands, added commands can be directly invoked via VNUI 220 by uttering a sequence such as "ok glass, post a tweet," instead of having to navigate to the added command by uttering the sequence "ok glass, open Glass Apps, post a tweet."

In addition, a menu item for an added command can be the command itself, instead of an ambiguous menu item that merely opens an app or leads to further menu items. For example, a menu item such as the command "post a tweet" provides more guidance to a wearer than a menu item such as "open Twitter."

A wearer may choose which additional or third-party applications or features to install or enable in a set-up portal for the HMD device. The set up portal may be part of the HMD or the VNUI 220 itself, or it may be accessed through interfaces of other devices (such as an Internet browser on a computing device). Additional or third-party applications may also be added to the VNUI automatically by a computing device executing suitable software.

If a wearer chooses particular additional or third-party applications or features, there may be a set-up sequence that asks a wearer to specify whether:

I'd like to use Glass to . . .
. . . post a tweet [ON|OFF]
. . . call an Uber car [ON|OFF]

Accordingly, commands can be added to the voice navigable menu 300 based on the features that the wearer enables. Once added to the voice navigable menu 300, the added commands can be displayed in the visible menu 305 and treated similarly to the commands discussed above.

One unique property of this example set-up sequence is that the set-up flow uses the same verb form of a command that a wearer would utter when invoking the command. In particular, uttered commands (e.g., "post a tweet") use the English imperative verb form, while the set-up flow ("I'd like to use Glass to . . . ") uses the English infinitive verb form, and each verb form is orthographically/lexicographically identical in English. In other words, a wearer can use the same verb form of "post a tweet" both during a set-up sequence ("I'd like to use Glass to post a tweet") and when invoking the command ("ok glass, post a tweet").

Figure 9A:
FIG. 9A shows an example visible menu, according to an example embodiment.
Figure 9B:
FIG. 9B shows an example visible menu, according to an example embodiment.
Figure 9C:
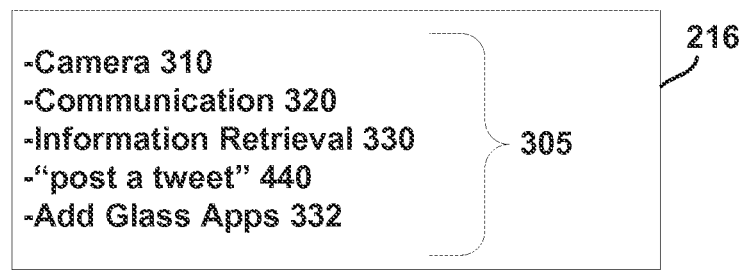
FIG. 9C shows an example visible menu, according to an example embodiment.

FIGS. 9A-9C depict an example set-up sequence that can be presented on the display 216 of VNUI 220. In this example, FIG. 9A shows a menu item Add Glass Apps 332 in the visible menu 305. To select the Add Glass Apps 332 menu item, a wearer can utter "ok glass, add glass apps."

VNUI 220 may then present to the wearer the visible menu 305 of FIG. 9B, which displays two available commands for selection: enable "post a tweet" 334 and enable "call an Uber car" 336. To enable one of the available commands, a wearer can utter "ok glass, enable 'post a tweet.'"

VNUI 220 may then present to the wearer the visible menu 305 of FIG. 9C, which displays the "post a tweet" 440 command as a menu item. As discussed, the "post a tweet" command may also be added or associated with a category of added commands, such as the Glass Apps 340 category of FIG. 8B.

Added commands (such as third-party or other added commands) may be merged into an existing library of voice commands. Because of the potentially large number of added or third-party commands, potential added commands can be selected and approved to maintain distinctiveness from other commands. One consideration may be selecting potential added commands that are long enough to provide phonetic distinctiveness from other commands (for example, "post a tweet" instead of "tweet").

In addition, a computer executing suitable software can determine a phonetic distance between a potential added command set and existing commands, perhaps in an existing command set. If the smallest phonetic distance between commands in the potential added command set and an existing command set is greater than a threshold, the computer can determine that the potential added command set may be acceptable for addition in the command set. If the smallest phonetic distance is less than the threshold, however, then the computer can determine that the potential added command set may not be distinguishable from the existing command set by the speech recognition system. In some embodiments, the computer can identify command(s) in the potential added command set whose phonetic distance is within the threshold, and suggest those commands be modified or rejected for inclusion of the potential added command set into the existing command set.

The VNUI can be periodically updated with added commands as needed.

F. Example Methods of Operation

Figure 10:
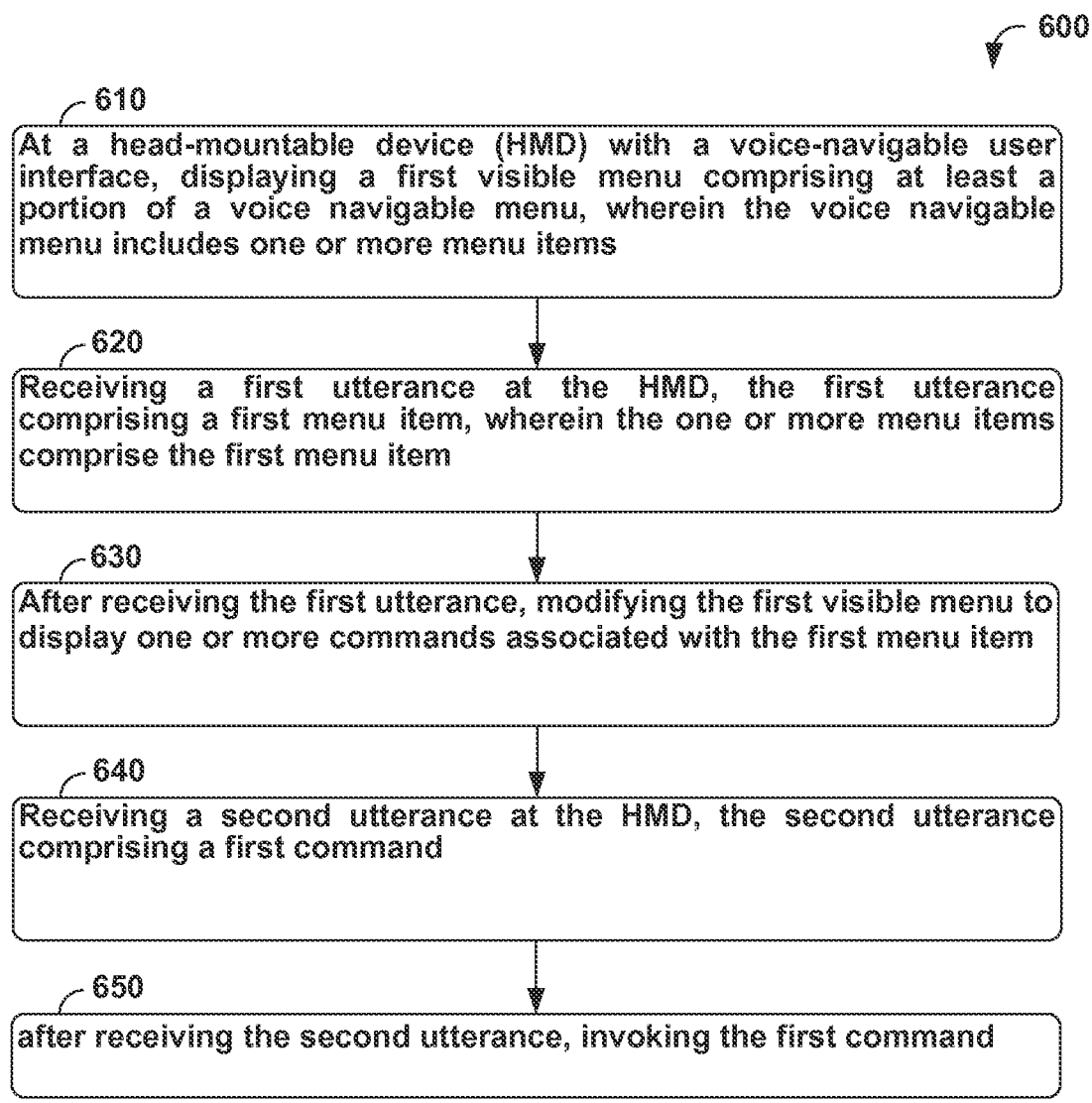
FIG. 10 is a flow chart illustrating a method, according to an example embodiment.

FIG. 10 is a flow chart illustrating a method 600, according to an example embodiment. In FIG. 10, method 600 is described by way of example as being carried out by a wearable computer and possibly a wearable computer that includes a head-mounted display (HMD). However, it should be understood that example methods, such as method 600, may be carried out by a wearable computer without wearing the computer. For example, such methods may be carried out by simply holding the wearable computer using the wearer's hands. Other possibilities may also exist.

Further, example methods, such as method 600, may be carried out by devices other than a wearable computer, and/or may be carried out by sub-systems in a wearable computer or in other devices. For example, an example method may alternatively be carried out by a device such as a mobile phone, which is programmed to simultaneously display a graphic object in a graphic display and also provide a point-of-view video feed in a physical-world window. Other examples are also possible.

As shown in FIG. 10, method 600 begins at block 610, where an HMD with a voice navigable user interface can display a first visible menu. The first visible menu can comprise at least a portion of a voice navigable menu. As discussed above, the first visible menu may comprise a portion of the voice navigable menu or the entire voice navigable menu. In addition, the voice navigable menu can include one or more menu items. The menu items can include both categories and commands.

At block 620, the HMD can receive a first utterance. The first utterance can comprise a first menu item. The one or more menu items recited in block 610 can comprise the first menu item. In some cases, the first menu item may not be displayed on the visible menu when uttered. In other cases, the first menu item may be displayed on the visible menu when uttered.

At block 630, after receiving the first utterance, the HMD can modify the first visible menu to display one or more commands associated with the first menu item. In some embodiments, the HMD can expand the first visible menu to display the one or more commands as sub-level menu items in-line with the first menu item. In other embodiments, the HMD can display the one or more commands as a stand-alone submenu.

At block 640, the HMD can receive a second utterance. The second utterance can comprise a first command.

At block 650, after receiving the second utterance, the HMD can invoke the first command.

In some embodiments, method 600 may further involve the HMD displaying at least a portion of a second visible menu. The second visible menu can include the first command and at least one menu item of the one or more menu items. In these embodiments, the second visible menu can display the first command above the at least one menu item. In other embodiments, the second visible menu can display the first command in a manner more prominent than the at least one menu item, but not necessarily above the at least one menu item.

In some embodiments, method 600 can additionally include receiving a third utterance at the HMD. The third utterance can comprise a second command, the second command differing from the first command. After receiving the third utterance, the HMD can invoke the second command. In addition, the method can include the HMD displaying at least a portion of a third visible menu. The third visible menu can include the second command and at least one menu item of the one or more menu items. And the third visible menu can display the second command above the at least one menu item. In some embodiments, the third visible menu can further include the first command.

Figure 11:
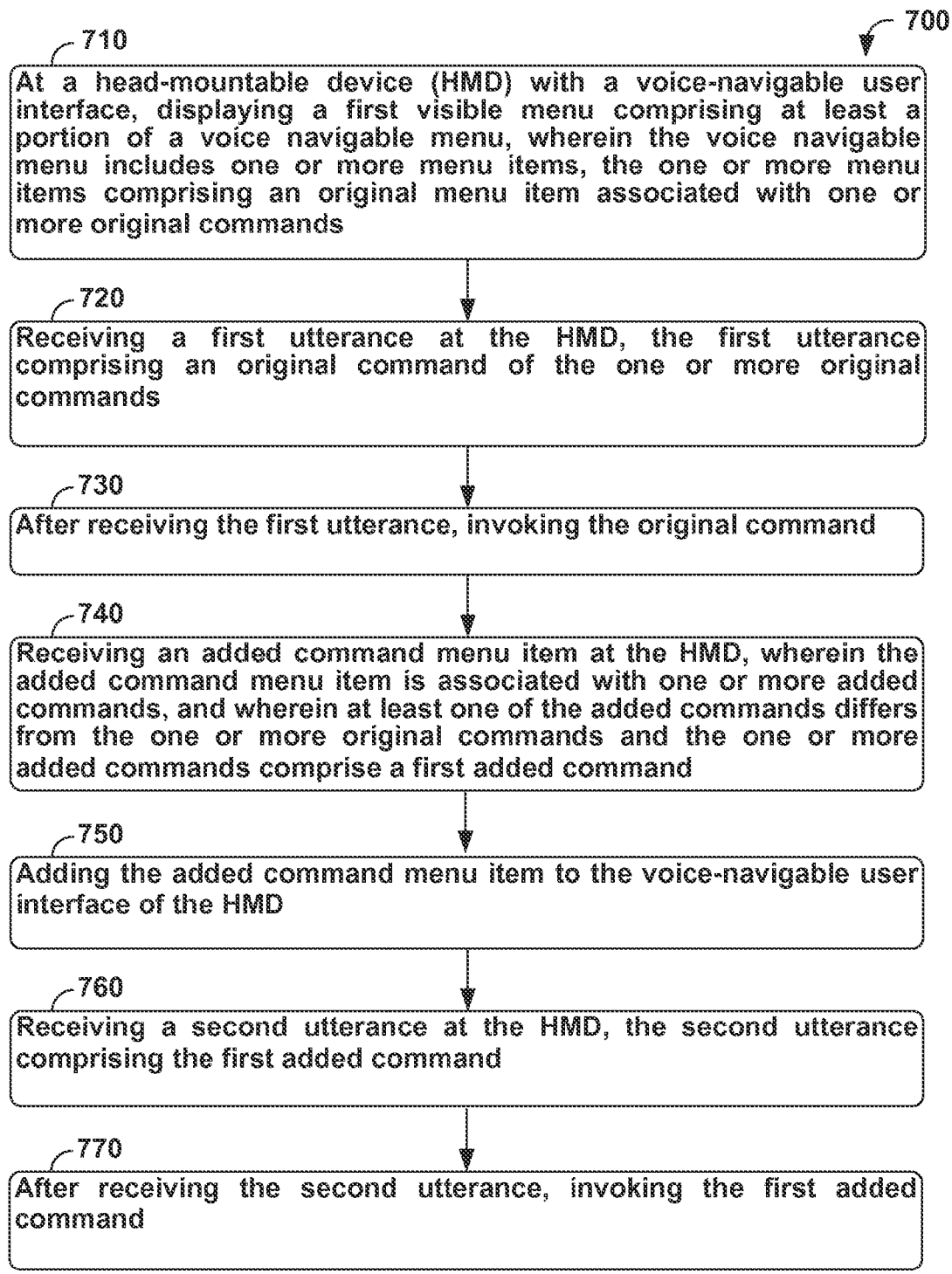
FIG. 11 is a flow chart illustrating another method, according to an example embodiment.

FIG. 11 is a flow chart illustrating a method 700, according to an example embodiment. In FIG. 11, method 700 is described by way of example as being carried out by a wearable computer and possibly a wearable computer that includes a head-mounted display (HMD). However, it should be understood that example methods, such as method 700, may be carried out by a wearable computer without wearing the computer. For example, such methods may be carried out by simply holding the wearable computer using the wearer's hands. Other possibilities may also exist.

Further, example methods, such as method 700, may be carried out by devices other than a wearable computer, and/or may be carried out by sub-systems in a wearable computer or in other devices. For example, an example method may alternatively be carried out by a device such as a mobile phone, which is programmed to simultaneously display a graphic object in a graphic display and also provide a point-of-view video feed in a physical-world window. Other examples are also possible.

As shown in FIG. 11, method 700 begins at block 710, where an HMD with a voice navigable user interface can display a first visible menu. The first visible menu can comprise at least a portion of a voice navigable menu. As discussed above, the first visible menu may comprise a portion of the voice navigable menu or the entire voice navigable menu. In addition, the voice navigable menu can include one or more menu items.

The one or more menu items in block 710 can comprise an original menu item. The original menu item can be associated with one or more original commands.

At block 720, the HMD can receive a first utterance. The first utterance can comprise an original command of the one or more original commands. In some cases, the first added command may not be displayed on the visible menu when uttered. In other cases, the first menu item may be displayed on the visible menu when uttered.

At block 730, after receiving the first utterance, the HMD can invoke the original command.

At block 740, the HMD can receive an added command menu item. The added command menu item can be associated with one or more added commands. At least one of the added commands can differ from the one or more original commands. In addition, the one or more added commands can comprise a first added command.

At block 750, the HMD can add the added command menu item to the voice-navigable user interface of the HMD.

At block 760, the HMD can receive a second utterance. The second utterance can comprise the first added command. In some cases, the first added command may not be displayed on the visible menu when uttered. In other cases, the first menu item may be displayed on the visible menu when uttered.

At block 770, after receiving the second utterance, the HMD can invoke the first added command.

In some embodiments, method 700 may further involve the HMD receiving a third utterance. The third utterance can comprise an identification of the added command menu item. After receiving the third utterance, the HMD can modify the first visible menu to display the one or more added commands.

In some embodiments, method 700 can additionally include the HMD displaying at least a portion of a second visible menu. The second visible menu can include the first added command and at least one menu item of the one or more menu items. In addition, the second visible menu can display the first added command above the at least one menu item.

In some embodiments, the one or more added commands of method 700 can further comprise a second added command, the second added command differing from the first added command, and method 700 can further include receiving a fourth utterance at the HMD. The fourth utterance can comprise the second added command. After receiving the fourth utterance, the HMD can invoke the second added command. In addition, the method can further include the HMD displaying at least a portion of a third visible menu. The third visible menu can include the second added command and at least one menu item of the one or more menu items. And the third visible menu can display the second added command above the at least one menu item. In some embodiments, the third visible menu can also include the first added command.

G. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method, comprising:
    establishing, by a head-mountable device (HMD), a communication session with a remote device in order to provide a voice-navigable user interface, wherein the remote device comprises a display that initially has a first visible menu comprising at least a portion of a voice navigable menu displayed thereon, wherein the voice navigable menu includes one or more menu items, and wherein each menu item comprises a text version of a corresponding speech command from a plurality of speech commands;
    receiving a first utterance at the HMD, the first utterance comprising the speech command corresponding to a first menu item from the one or more menu items;
    in response to receiving the first utterance corresponding to first menu item, sending an instruction to the remote device to modify the first visible menu to display, on the display of the remote device, one or more commands associated with the first menu item, wherein each displayed command comprises a text version of a corresponding speech command from the plurality of speech commands;
    receiving a second utterance at the HMD, the second utterance comprising the speech command corresponding to a first command from the one or more commands; and
    in response to receiving the second utterance, initiating a process to invoke the first command.

2. The method of claim 1, wherein initiating the process to invoke the first command comprises sending an instruction to the remote device to display at least a portion of a second visible menu, wherein the second visible menu includes the first command and at least one menu item of the one or more menu items, wherein each displayed menu item comprises a text version of a corresponding speech command from a plurality of speech commands, and wherein the second visible menu displays the first command above the at least one menu item.

3. The method of claim 2, further comprising:
    receiving a third utterance at the HMD, the third utterance comprising the speech command corresponding to a second command from the one or more commands, the second command differing from the first command;
    after receiving the third utterance, initiating a process to invoke the second command; and
    sending an instruction to the remote device to display at least a portion of a third visible menu, wherein the third visible menu includes the second command and at least one menu item of the one or more menu items, and wherein the third visible menu displays the second command above the at least one menu item.

4. The method of claim 3,
    wherein the third visible menu further includes the first command; and
    wherein an order in which the first command and the second command are displayed in the third visible menu is determined based on at least a frequency of use for the first command and a frequency of use for the second command.

5. The method of claim 3,
    wherein the third visible menu further includes the first command; and
    wherein an order in which the first command and the second command are displayed in the third visible menu is determined based on at least a recency of use for the first command and a recency of use for the second command.

6. The method of claim 3,
    wherein the third visible menu further includes the first command; and
    wherein an order in which the first command and the second command are displayed in the third visible menu is determined based on at least a combination of a frequency of use and a recency of use for the first command and a combination of a frequency of use and a recency of use for the second command.

7. The method of claim 1, further comprising, after establishing the communication session and before the remote device display the first visible menu:
    initially receiving a hotword utterance comprising a hotword;
    in response to receiving the hotword utterance, sending an instruction to the remote device to display at least a portion of the first visible menu.

8. The method of claim 1, wherein the first menu item comprises an identification of a category.

9. The method of claim 1, wherein at least one menu item of the one or more menu items comprises an identification of a category.

10. The method of claim 1, wherein the instruction to modify the first visible menu causes an expansion of the first visible menu to display the one or more commands in-line with the first menu item.

11. The method of claim 1, wherein the instruction to modify the first visible menu indicates to the remote device to display the one or more commands as a submenu.

12. A head-mountable device (HMD), comprising:
at least one microphone;
a processor; and
a non-transitory computer-readable medium configured to store at least program instructions that, when executed by the processor, cause the HMD to carry out functions comprising:
establishing a communication session between the HMD and a remote device in order to provide a voice-navigable user interface, wherein the remote device comprises a display that initially has a first visible menu comprising at least a portion of a voice navigable menu displayed thereon, wherein the voice navigable menu includes one or more menu items, and wherein each menu item comprises a text version of a corresponding speech command from a plurality of speech commands;
receiving a first utterance via the microphone, the first utterance comprising the speech command corresponding to a first menu item from the one or more menu items;
in response to receiving the first utterance corresponding to first menu item, sending an instruction to the remote device to modify the first visible menu to display, on the display of the remote device, one or more commands associated with the first menu item, wherein each displayed command comprises a text version of a corresponding speech command from the plurality of speech commands;
receiving a second utterance via the microphone, the second utterance comprising the speech command corresponding to a first command from the one or more commands; and
in response to receiving the second utterance, initiating a process to invoke the first command.

13. A method, comprising:
establishing, by a remote device, a communication session with a head-mountable device (HMD) to provide a voice-navigable user interface via at least one microphone of the HMD, wherein the remote device comprises a display;
initially displaying, by the remote device, a first visible menu comprising at least a portion of a voice navigable menu, wherein the voice navigable menu includes one or more menu items, and wherein each menu item comprises a text version of a corresponding speech command from a plurality of speech commands;
receiving, by the remote device an indication of a first utterance captured by at least one microphone of the HMD, the first utterance comprising the speech command corresponding to a first menu item from the one or more menu items;
in response to receiving the indication of the first utterance, modifying the first visible menu to display one or more commands associated with the first menu item, wherein each displayed command comprises a text version of a corresponding speech command from the plurality of speech commands;
receiving, by the remote device, an indication of a second utterance captured by the at least one microphone of the HMD, the second utterance comprising the speech command corresponding to a first command from the one or more commands; and
in response to receiving the second utterance, invoking the first command.

14. The method of claim 13, further comprising:
displaying at least a portion of a second visible menu, wherein the second visible menu includes the first command and at least one menu item of the one or more menu items, wherein each menu item comprises a text version of a corresponding speech command from a plurality of speech commands; and
wherein the second visible menu displays the first command above the at least one menu item.

15. The method of claim 14, further comprising:
receiving, by the remote device, an indication of a third utterance captured by the at one microphone of the HMD, the third utterance comprising the speech command corresponding to a second command from the one or more commands, the second command differing from the first command;
after receiving the third utterance, invoking the second command; and
displaying at least a portion of a third visible menu, wherein the third visible menu includes the second command and at least one menu item of the one or more menu items, and wherein the third visible menu displays the second command above the at least one menu item.

16. The method of claim 15,
wherein the third visible menu further includes the first command; and
wherein an order in which the first command and the second command are displayed in the third visible menu is determined based on at least a frequency of use for the first command and a frequency of use for the second command.

17. The method of claim 15,
wherein the third visible menu further includes the first command; and
wherein an order in which the first command and the second command are displayed in the third visible menu is determined based on at least a recency of use for the first command and a recency of use for the second command.

18. The method of claim 15,
wherein the third visible menu further includes the first command; and
wherein an order in which the first command and the second command are displayed in the third visible menu is determined based on at least a combination of a frequency of use and a recency of use for the first command and a combination of a frequency of use and a recency of use for the second command.

19. The method of claim 13, further comprising, before displaying the first visible menu:
receiving and indication of a hotword utterance captured by the at least one microphone of the HMD, wherein the hotword utterance comprises a hotword; and
initiating the displaying of at least a portion of the first visible menu in response to receipt of the indication of the hotword utterance.

20. The method of claim 13, wherein modifying the first visible menu to display the one or more commands associated with the first menu item comprises expanding the first visible menu to display the one or more commands in-line with the first menu item.

* * * * *